United States Patent [19]

Ikeda

[11] Patent Number: 4,602,455

[45] Date of Patent: Jul. 29, 1986

[54] METHOD AND APPARATUS FOR CULTIVATING YOUNG SEEDLINGS OF WELSH ONION

[76] Inventor: Yoshiyasu Ikeda, 1346 Kami, Futtsu-shi, Chiba-ken, Japan

[21] Appl. No.: 603,658

[22] Filed: Apr. 26, 1984

[30] Foreign Application Priority Data

Apr. 28, 1983 [JP] Japan ................................ 58-75333

[51] Int. Cl.⁴ ............................................. A01G 31/00
[52] U.S. Cl. .......................................... 47/64; 47/60; 47/61
[58] Field of Search ................... 47/59, 60, 61, 62, 63, 47/64, 14, 15, 16, 29

[56] References Cited

U.S. PATENT DOCUMENTS

| | | | |
|---|---|---|---|
| 3,704,545 | 12/1972 | Van Reisen | 47/29 |
| 4,292,760 | 10/1981 | Krave | 47/14 |
| 4,312,152 | 1/1982 | Drury et al. | 47/63 |

Primary Examiner—Robert E. Bagwill
Assistant Examiner—Bradley M. Lewis
Attorney, Agent, or Firm—Toren, McGeady, Stanger, Goldberg & Kiel

[57] ABSTRACT

The present method and apparatus can be applied to cultivation of young seedlings of Welsh onion economically in a mass production way utilizing the growing progresses of this vegetable, during which seed coats can be scraped and removed by the flange of each mesh of a screen sheet or screen film when a stalk stretches itself at the knee part uprightly. Young seedlings of Welsh onion are supplied as material for hors-d'oeuvre, soup and Japanese "sushi".

3 Claims, 8 Drawing Figures

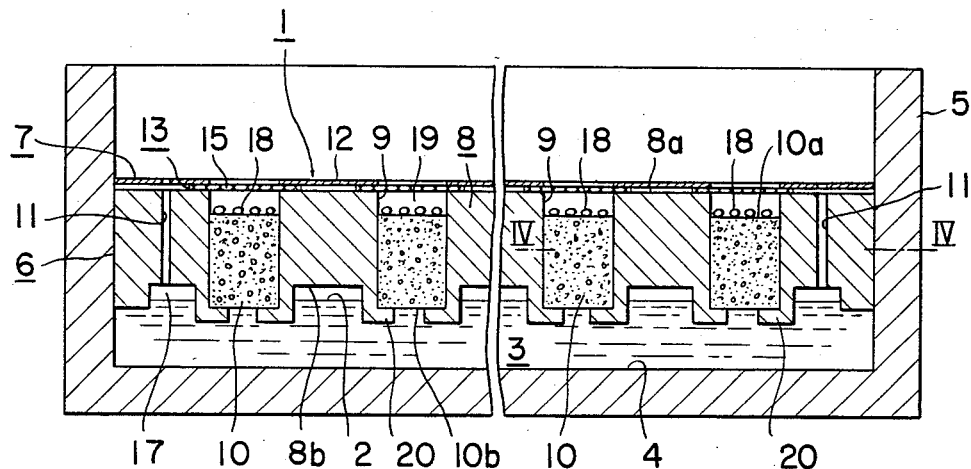
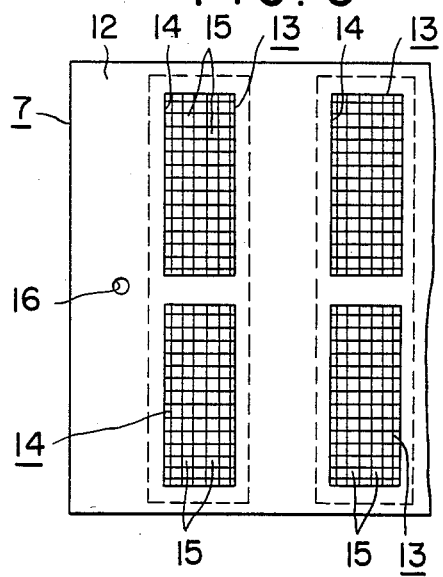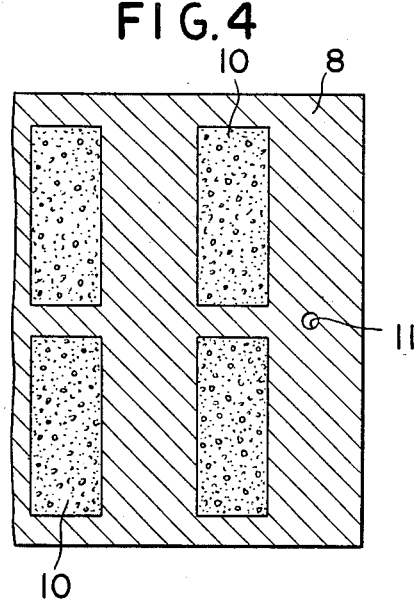

METHOD AND APPARATUS FOR CULTIVATING YOUNG SEEDLINGS OF WELSH ONION

BACKGROUND OF THE INVENTION

This invention relates to a method and apparatus for cultivating young seedlings of Welsh onion. The young seedling of Welsh onion, which is called "menegi" in Japanese, is a kind of vegetable having a fine stalk and can be easily cultured and harvested through all seasons of a year.

Referring to FIG. 1, the young seedling of Welsh onion has such growing progresses as mentioned below:

1. Seeds (a) of Welsh onion are planted on a culture bed (b).
2. A seed puts forth a bud and takes a root (c) in which a stalk (d) is in the bending state, as shown in FIG. 1 (I).
3. The stalk (d) is still growing in the bending state with a seed coat (e) on its end which is in a position apart from the planting surface (f), as shown in FIG. 1 (II).
4. Then, the stalk (d) stretches itself at the knee part (g) uprightly, in which the seed coat (e) is in the top position, as shown in FIG. 1 (III).

When a number of young seedlings of Welsh onion have grown up to an uprightly stretched state and a desired length, they are harvested.

Heretofore, seed coats on the top of young seedlings of Welsh onion are manually removed with fingers or combs and after removing them roots are cut away, or seed coats and roots are manually cut away together. Thus, remaining stalks are supplied as materials for hors-d'oeuvre, soup and Japanese "sushi".

However, the manual works for removing seed coats with fingers or combs as mentioned above are troublesome and inefficient, so that usually the means for cutting away seed coats is adopted. In this case, we cannot help cutting away additionally the stalk portion next to the seed coat as a matter of fact, which is uneconomical because the edible part of a stalk becomes shorter.

SUMMARY OF THE INVENTION

This invention relates to a method and apparatus for cultivating young seedlings of Welsh onion economically and in mass production way.

An object of the invention is to provide a method for cultivating young seedlings of Welsh onion utilizing the growing progresses of young seedlings of Welsh onion, in particular utilizing the nature that a stalk stretches at the knee part uprightly.

Another object of the invention is to provide an apparatus for cultivating young seedlings of Welsh onion, in which seeds are planted on the culture ground member and seed coats can be scraped and removed by a grid sheet when the stalk stretches itself.

A further object of the invention is to provide an apparatus for cultivating young seedlings of Welsh onion, in which seeds are planted on the culture ground member being fed with water and nourishment and seed coats can be scraped and removed by the crossbar portion of each mesh of a grid sheet when the stalk stretches itself at the knee part uprightly.

BRIEF DESCRIPTION OF THE DRAWINGS

In the accompanying drawings:

FIG. 2 is a sectional view of an essential part of an apparatus according to the present invention;

FIG. 3 is a partial plan view of a plate of the apparatus according to the present invention;

FIG. 4 is a sectional view corresponding to a line IV—IV in FIG. 2;

DETAILED DESCRIPTION OF THE INVENTION

Figure 1:
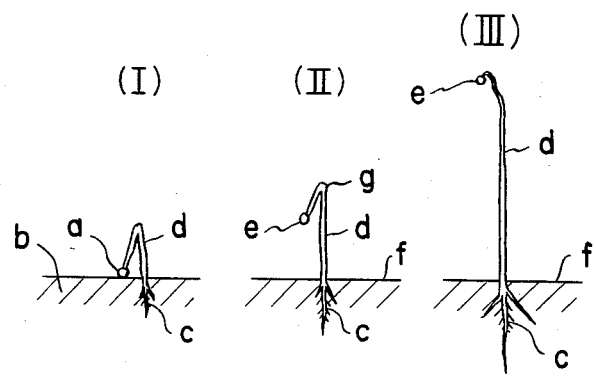
FIG. 1(I, II and III) is a schematic view showing growing progress of a young seedling of Welsh onion.
Figure 5:
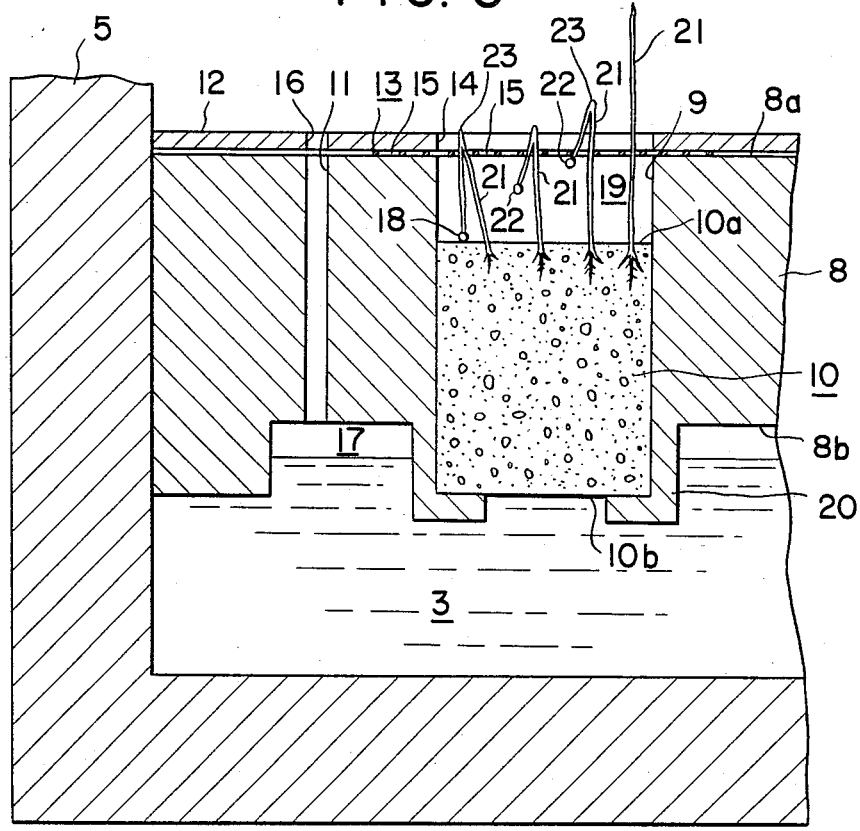
FIG. 5 is an enlarged sectional view, in part, of FIG. 2 wherein young seedlings of Welsh onion are shown from left to right according to their growing stages.
Figure 6:
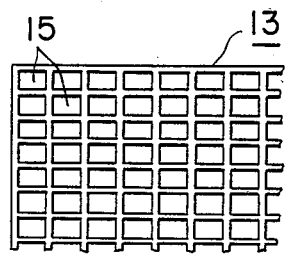
FIG. 6 is a partial plan view of a grid sheet of the apparatus according to the invention.

Referring to FIGS. 1 through 6, one embodiment of this invention will be explained in the following.

A floating body 1 is suspended on the liquid level 2 of liquid 3, said liquid level 2 being kept in a predetermined height from the inside bottom 4 of the vessel 5.

The floating body 1 consists of a main body 6 and a plate member 7.

The main body 6 consists of a holding member 8 having rectangular opened fitting portions 9, 9, . . . in two lateral rows and culture ground members 10, 10, . . . fitted into each of said holes 9, 9, . . .

The upper surface of the culture ground member 10 is used as a planting surface 10a which is kept to the position lower than the upper surface 8a of the holding member 8. The lower surface 10b of the culture ground member 10 is kept to the position lower than the lower surface 8b of the holding member 8.

A holding member 8 has air ventilating holes 11, 11, . . . The culture ground member 10 is made of polyurethane foam and fed with water and nourishment.

As shown in FIG. 3, a plate member 7 consists of a plate portion 12 and a grid sheet 13, said plate portion 12 having openings 14, 14, . . . which are the same as said opened fitting portions 9, 9, . . . with respect to shape and scale, said grid sheet 13 having a desired size of meshes 15, namely a net having a number of fine rectangular meshes, which is adhered to the periphery of the opening 14 at the back surface of the plate portion 12.

The plate member 7 is provided with a perforated hole 16 at the position corresponding to air ventilating holes 11, 11, . . . of the holding member 8.

The lower surface 10b of the culture ground member 10 is positioned below the liquid surface 2 and a space 17 is provided between the liquid level 2 and the lower surface 8b of the holding member 8.

Seeds 18, 18, . . . are planted on the planting surface 10a of the culture ground member 10, 10, . . . , the plate member 7 is put on an upper surface 8a of the holding member 8, thus the opened fitting portion 9 is covered by the grid sheet 13 and also the space 19 of a predetermined distance is formed between the grid sheet 13 and the planting surface 10a of the culture ground member 10.

In this case, the plate member 7 should be mounted so as not to be separated from the upper surface 8a of the holding portion 8.

A supporting portion 20 of the holding member 8 supports the culture ground member 10.

Water and nourishment are fed to planted seeds 18 on the planting surface 10a through the culture ground member 10, because the lower surface 10b of the culture ground member 10 is positioned below the liquid level 2.

Meanwhile, air is supplied to planted seeds 18 on the planting surface 10a through the culture ground member 10, because the air is supplied to the space 17 through the holes 16 and the air ventilating holes 11.

Seeds 18 put forth buds and take roots in which each stalk 21 is in the bending state and at the next growing stage the stalk 21 is still growing in the bending state with a seed coat 22 on its end which is in the position apart from the planting surface 10a.

At further growing stage, a knee part 23 of the stalk 21 is caused to project through a mesh 15 of the grid sheet 13, then the stalk 21 stretches itself at knee part 23 uprightly, at the same time the seed coat 22 is scraped by the crossbar portion of the mesh 15 of the grid sheet 13 due to the growing force of young seedling of Welsh onion, and thus any seed coat 22 is no longer attached to the top end of the stalk 21.

Each mesh 15 of the grid sheet 13 should be so designed as to prevent the passing of seed coat 22; namely it should be so designed that seed coat 22 can be scraped by the crossbar position of the mesh 15 when the stalk 21 stretches itself at the knee part 23 uprightly.

When young seedlings of Welsh onion are grown up to a predetermined length (10 cm to 25 cm), they are put on the market in the state that they are planted on the culture ground member together with the plate member.

Figure 7:
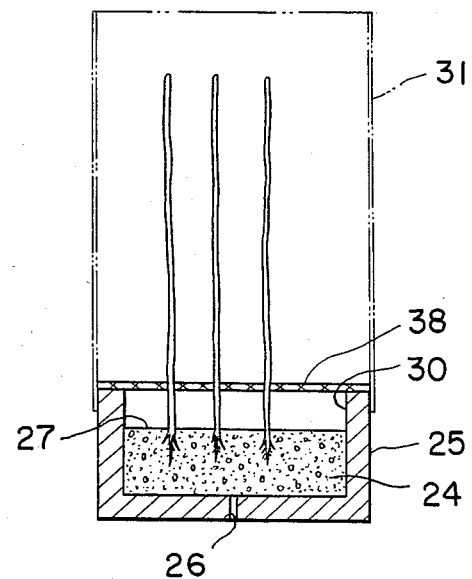
FIG. 7 is a sectional view of an essential part of another apparatus according to the present invention.
Figure 8:
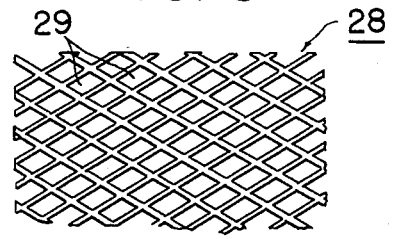
FIG. 8 is a partial plan view of a grid sheet of another apparatus according to the present invention.

FIGS. 7 and 8 show another embodiment of this invention, in which a culture ground member 24 is made of a sponge material and fitted into the vessel 25. Water and nourishment are fed into said culture ground member 24 through a perforated hole 26 provided at the bottom of the vessel 25.

Seeds are planted on the planting surface 27 of the culture ground member 24, a grid sheet 28 having a desired size of meshes 29 is adhered to the upper periphery of the opening 30 of the vessel 25, and a tube shaped plastic film 31 at the lower end periphery thereof is adhered to the vessel 25 at the outer periphery of the opening 30 thereof.

When young seedlings of Welsh onion are grown up to a predetermined length they are put on the market in the state that they are planted in the culture ground member 24.

As mentioned above, this invention is to provide the method and apparatus for self-removing the seed coats which utilize the growing characteristic feature of young seedlings of Welsh onion, and also which eliminate troublesome work for removing seed coats such as combing or cutting of the tops of young seedlings of Welsh onion. Thus, this invention can be applied to a mass production of young seedlings of Welsh onion at high efficiency and has an effect for increasing its demand.

What is claimed is:

1. A method for cultivating young seedlings of Welsh onion comprising the steps of:
   arranging a grid sheet having a desired size of meshes horizontally and at a predetermined distance above a planting surface;
   causing a knee part of the stalk of the young seedling of Welsh onion to project through the mesh of the grid sheet when said young seedling of Welsh onion is growing; and
   scraping and removing a seed coat on the stalk end by the crossbar portion of each mesh of the grid sheet when the stalk stretches itself at the knee part uprightly.

2. An apparatus for cultivating young seedlings of Welsh onion comprising:
   a vessel; and
   a floating body suspended on a liquid in the vessel, the liquid level being kept at a predetermined height from the inside bottom of the vessel, said floating body consisting of a main body and a plate member, said main body consisting of a holding member having opened fitting portions and culture ground members fitted into each of said opened fitting portions, said plate member being put on an upper surface of the holding member and consisting of a plate portion having openings and grid sheets having a desired size of meshes, said grid sheet being adhered to the periphery of each of said openings, said opened fitting portions being covered by the grid sheet, and a space formed between the grid sheet and the planting surface of the culture ground member at a predetermined distance.

3. An apparatus for cultivating young seedlings of Welsh onion comprising:
   a vessel; and
   a floating body suspended on a liquid in the vessel, the liquid level being kept at a predetermined height from an inside bottom of the vessel, said floating body consisting of a main body and a plate member, said main body consisting of a holding member having opened fitting portions and having air ventilating holes and a culture ground member fitted into each of said opened fitting portions, said plate member being put on an upper surface of the holding member and consisting of a plate portion having openings and grid sheets having a desired size of meshes, said grid sheet being adhered to the periphery of each of said openings, said opened fitting portions being covered by the grid sheet, a space formed between the grid sheet and the planting surface of the culture ground member at a predetermined distance, and another space formed between the liquid level and the lower surface of the holding member so that air can flow through the air ventilating holes to another space.

* * * * *